United States Patent
Huh et al.

(10) Patent No.: US 7,616,214 B2
(45) Date of Patent: Nov. 10, 2009

(54) METHOD AND APPARATUS FOR GENERATING CHARACTERISTIC DATA OF ILLUMINATION AROUND IMAGE DISPLAY DEVICE

(75) Inventors: Young-sik Huh, Gyeonggi-do (KR); Du-sik Park, Gyeonggi-do (KR); Heui-keun Cho, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1008 days.

(21) Appl. No.: 10/733,406

(22) Filed: Dec. 12, 2003

(65) Prior Publication Data

US 2004/0189630 A1     Sep. 30, 2004

(30) Foreign Application Priority Data

Dec. 12, 2002   (KR) ............... 10-2002-0079302
Dec. 3, 2003    (KR) ............... 10-2003-0087271

(51) Int. Cl.
     *G09G 5/02*    (2006.01)
(52) U.S. Cl. ............... 345/589; 345/207; 345/426; 345/546; 345/581; 345/619; 348/227.1; 382/274
(58) Field of Classification Search ............... 348/227.1
     See application file for complete search history.

(56) References Cited

U.S. PATENT DOCUMENTS

| | | | |
|---|---|---|---|
| 4,941,038 A | 7/1990 | Walowit | |
| 5,313,219 A | 5/1994 | Shakun et al. | |
| 5,870,069 A | 2/1999 | Choh et al. | |
| 6,292,228 B1 | 9/2001 | Cho | |
| 6,373,531 B1 * | 4/2002 | Hidaka et al. | 348/603 |
| 6,480,202 B1 | 11/2002 | Deguchi et al. | |
| 6,628,822 B1 | 9/2003 | Nakabayashi et al. | |
| 6,937,245 B1 * | 8/2005 | Van Hook et al. | 345/546 |
| 7,142,218 B2 * | 11/2006 | Yoshida et al. | 345/589 |
| 2004/0013298 A1 | 1/2004 | Choe et al. | |

FOREIGN PATENT DOCUMENTS

| | | |
|---|---|---|
| EP | 0 700 218 A2 | 3/1996 |
| EP | 0 863 677 A1 | 9/1998 |
| EP | 0 891 077 A2 | 1/1999 |
| EP | 0 907 283 A1 | 4/1999 |
| EP | 1 178 680 A2 | 2/2002 |
| EP | 1 251 482 A2 | 10/2002 |
| GB | 2 369 515 A | 5/2002 |
| JP | 11-32228 A | 2/1999 |
| JP | 11-032228 A | 2/1999 |
| JP | 2002-72992 | 3/2002 |
| JP | 2003-070017 A | 3/2003 |
| KR | 1998-072858 | 11/1998 |

(Continued)

OTHER PUBLICATIONS

"LMS Color Space—Wikipedia, the free encyclopedia" (entry and definition from Wikipedia.com (http://en.wikipedia.org/wiki/LMS_Color_Space). Page last modified Mar. 23, 2008. Date accessed Apr. 4, 2008). pp. 1-3.*

(Continued)

*Primary Examiner*—Antonio A Caschera
(74) *Attorney, Agent, or Firm*—Buchanan Ingersoll & Rooney PC (57) ABSTRACT

A method of generating illumination characteristic data around an image display device, includes: obtaining predetermined illumination characteristic data around the image display device; and making the predetermined illumination characteristic data into a data format comprising a type block and an illuminance block. The type block indicates information on a type of illumination, and the illuminance block indicates information on the illuminance of illumination.

17 Claims, 5 Drawing Sheets

FOREIGN PATENT DOCUMENTS

| KR | 1020010046716 | 6/2001 |
|---|---|---|
| KR | 1020020079348 | 10/2002 |
| KR | 1020030058909 | 7/2003 |
| KR | 1020030067485 | 8/2003 |

OTHER PUBLICATIONS

"Lux—Wikipedia, the free encyclopedia" (entry and definition from Wikipedia.com (http://en.wikipedia.org/wiki/Lux). Page last modified Apr. 6, 2008. Date accessed Apr. 7, 2008). pp. 1-5.*

Korean Office Action date Sep. 13, 2005.

Official Action issued by the Japanese Patent Office on Jan. 9, 2007 in corresponding JP Patent Application No. 2003-414017, and English-language translation.

Official Action issued by the Chinese Patent Office on Mar. 24, 2006 in corresponding CN Patent Application No. 2003101249102, and English-language translation.

Official Action issued by the Japanese Patent Office in corresponding Japanese Patent Application No. 2003-414017, May 15, 2007; and English translation thereof.

European Search Report issued Nov. 7, 2007 in corresponding European Patent Application No. 07112242.8.

Official Action issued by the Chinese Patent Office on Jul. 11, 2008, in corresponding Chinese Patent Application No. 200610131803.6, and English-language translation.

* cited by examiner

700 GENERATE ILLUMINATION CHARACTERISTIC DATA
720 COMPENSATE FOR COLOR VARIATION IN INPUT IMAGE
740 OUTPUT IMAGE

FIG. 8

| TYPE OF ILLUMINATION | | ILLUMINANCE OF ILLUMINATION | |
|---|---|---|---|
| SEMANTICS | EXPRESSION VALUE (KELVIN UNIT) | SEMANTICS | VALUE GAP, EXPRESSION VALUE (LUX UNIT) |
| INCANDESCENCE | 2800 | DARK | <=10 |
| FLUORESCENT | 4200 | DIM | 10~200 |
| DAYLIGHT | 6500 | BRIGHT | 200~1000 |
| SKYLIGHT | 15000 | VERY BRIGHT | >=1000 |

METHOD AND APPARATUS FOR GENERATING CHARACTERISTIC DATA OF ILLUMINATION AROUND IMAGE DISPLAY DEVICE

BACKGROUND OF THE INVENTION

This application claims the priority of Korean Patent Application Nos. 2002-79302, and 2003-87271, filed on Dec. 12, 2002, and on Dec. 3, 2003, respectively, in the Korean Intellectual Property Office, the disclosures of which are incorporated herein in their entireties by reference.

1. Field of the Invention

The present invention relates to image processing, and more particularly, to a method and apparatus for generating illumination characteristic data around an image display device, and a method and apparatus for compensating for a color variation using the method and apparatus.

2. Description of the Related Art

In general, a color image is reproduced using a device-independent color processing method based on the specialization of a color input/output device. This is based on a device specialization method which sets the relationship between a color signal of the color input/output device and a standard color signal. In this case, a calorimetric correspondence between an input image and a displayed image can be achieved. There are various methods for the chromatic correspondence of the color characteristic of an image displayed on an image display device to the color characteristic of an initially input image or for the visual improvement of the color characteristic of the image displayed. However, these methods do not consider the effect of illumination around the image display device. Thus, in a case where the characteristics of illumination around the image display device vary, the chromatic correspondence or the visual improvement may not be achieved.

Also, a user uses limited types of image displays in limited environments. However, as wire/wireless networks develop, the user has used various types of image displays in various environments. Moreover, if the image display device cannot perform a compensation and transformation function, an image should be transformed in advance by a service device and then transmitted to the image display device. Here, illumination characteristic information to be transformed should be transmitted to an image providing device and the illumination characteristic information is preferably displayable in a general-purpose data structure such as Extension Markup Language (XML) or the like.,

SUMMARY OF THE INVENTION

The present invention provides a method and apparatus for generating illumination characteristic data around an image display device by which when an image is displayed on a user's image display device, and the illumination characteristic data around the image display device can be obtained and recorded.

The present invention also provides a method and apparatus for compensating for a color variation using the illumination characteristics data to remove a color variation in an image recognized by a user due to the effect of illumination around an image display device when the image is displayed on a user's display device.

The present invention also provides a computer-readable recording media on which the methods of generating the illumination characteristic data around the image display device and compensating for the color variation are recorded as a computer-executable program.

According to an aspect of the present invention, there is provided a method of generating illumination characteristic data around an image display device, including: obtaining predetermined illumination characteristic data around the image display device; and making the predetermined illumination characteristic data into a data format including a type block and an illuminance block. The type block indicates information on a type of illumination, and the illuminance block indicates information on the illuminance of illumination.

It is preferable that illumination characteristic data is obtained directly from a user via an interface. It is preferable that the predetermined illumination characteristic data includes, information on the type of illumination and information on the illuminance of illumination. It is preferable that the information on the type of illumination is about one of an incandenscent lamp, a flouresent lamp, daylight, and skylight. It is preferable that the information on illuminance of illumination is about dark, dim, bright, and very bright phases. It is preferable that illumination characteristic data is obtained via a measurement sensor. It is preferable that the predetermined illumination characteristic data includes information on the type of illumination and information on the illuminance of illumination. It is preferable that the information on the type of illumination includes a color temperature of illumination or a coordinate value in chromaticity coordinates of illumination. It is preferable that the information on the illuminance of illumination is a numerical illuminance value represented in the units of Lux.

It is preferable that the type block includes: a flag to indicate whether data in a type payload is a color temperature value or a chromaticity coordinate value; and the type payload to indicate one of the color temperature value when the flag includes information for indicating the color temperature and the chromaticity coordinate value when the flag includes information for indicating the chromaticity coordinate value. It is preferable that the flag further includes information for indicating whether the data in the type payload is semantic information on the type of illumination, and the type payload further includes information on one of an incandenscent lamp, a flouresent lamp, daylight, and skylight when the flag is information indicating for semantic information. It is preferable that when the flag has a value of "0", the data in the type payload is the color temperature value, and when the flag has a value of "1", the data in the type payload is x-y chromaticity coordinates. It is preferable that when the flag has a value of "2", the data in the type payload is semantic information, and when the semantic information has a value of "0", the semantic information indicates the incandenscent lamp, when the semantic information has a value of "1", the semantic information indicates the flouresent lamp, and when the semantic information has a value of "3", the semantic information indicates the daylight. It is preferable that the illuminance block includes data for indicating a numerical Lux value. It is preferable that the illuminance block includes: a flag to indicate whether data in an illuminance payload is a numerical value or a semantic value; and the illuminance payload including the data for indicating a numerical Lux value when the flag includes information for indicating the numerical value or one of dark, dim, bright, and very bright phases when the flag includes information for indicating the semantic value. It is preferable that when the flag has a value of "0", the data in the illuminance payload indicates the numerical Lux value, when the flag has a value of "1", the data in the illuminance payload indicates the semantic value, and when the semantic value is "0", the semantic value indicates the dark phase, when the semantic value is "1", the semantic value indicates the dim phase, when the semantic value is "2", the semantic value indicates the bright phase, and when the semantic value is "3", the semantic value indicates the very bright phase.

According to another aspect of the present invention, there is provided an apparatus for generating illumination characteristic data around an image display device, including: an illumination characteristic obtainer which obtains illumination characteristic data including information on a type and illuminance of illumination; and an illumination characteristic data generator which makes the illumination characteristic data into a data format including a type block and an illuminance block. The type block indicates information on the type of illumination, and the illuminance block indicates information on the illuminance of illumination.

The illumination characteristic obtainer includes a user interface or a measurement sensor. The user interface obtains illumination characteristic data directly from a user via an interface, and the measurement sensor obtains illumination characteristic data by measuring illumination characteristics.

According to still another aspect of the present invention, there is provided an apparatus for compensating for a color variation, including: an illumination characteristic data unit which generates and outputs illumination characteristic data around an image display device, the illumination characteristic data including a data format including a type block for indicating information on a type of illumination and an illuminance block for indicating information on illuminance of illumination; and a color variation compensator which analyzes the illumination characteristic data to compensate for a color variation in an input image according to the type and illuminance of illumination. It is preferable that the illumination characteristic data unit further includes an illumination characteristic data obtainer which obtains the illumination characteristic data on the type and illuminance of illumination around the image display device. It is preferable that the illumination characteristic data obtainer obtains the illumination characteristic data directly from a user via a user interface or a measurement sensor. It is preferable that the color variation compensator includes: an illumination characteristic data analyzer which analyzes the illumination characteristic data into type block data and illuminance block data; a color temperature transformer which transforms the type block data into a color temperature value; a numerical value transformer which, when the illuminance block data is a semantic value, transforms the illuminance block data into a numerical value using a mapping table; and a color variation adjustor which transforms an input image itself or adjusts a color temperature and an illumination characteristic of the image display device so as to correspond to numerical values of a color temperature and illumination of the illumination characteristic data. It is preferable that the color variation adjustor includes: a color temperature compensator which, when the color temperature value of illumination is higher than a currently set color temperature value of illumination or a recommended color temperature value of illumination around the image display device, transforms the input image or adjusts a color temperature display characteristic of the image display device to increase a color temperature value of an image to be displayed or when the color temperature value of illumination is lower than the currently set color temperature value of illumination or the recommended color temperature value of illumination around the image display device, transforms the input image or adjusts the color temperature display characteristic of the image display device to reduce the color temperature value of the image to be displayed; and a color illuminance compensator which, when a Lux value of illumination is higher than a currently set Lux value of illumination or a recommended Lux value of illumination around the image display device, transforms the input image or adjusts the brightness characteristic and contrast characteristic of the image display device to increase a brightness value or contrast value of the image to be displayed or when the Lux value of illumination is lower than the currently set Lux value of illumination or the recommended Lux value of illumination around the image display device, transforms the input image or adjusts the brightness characteristic and contrast characteristic of the image display device to reduce the brightness value or the contrast value of the image to be displayed.

According to yet another aspect of the present invention, there is provided a method of compensating for a color variation, including: generating illumination characteristic data around an image display device, the illumination characteristic data including a data format including a type block for indicating information on a type of illumination and an illuminance block for indicating information on illuminance of illumination; and analyzing the illumination characteristic data to compensate for a color variation in an input image according to the type and illuminance of illumination. It is preferable that the generating of the illumination characteristic data includes: obtaining the illumination characteristic data on the type and illuminance of illumination around the image display device; and generating the illumination characteristic data including the data format including the type block for indicating the information on the type of illumination and the illuminance block for indicating the information on the illuminance of illumination. It is preferable that the illumination characteristic data is obtained directly from a user via a user interface or a measurement sensor. It is preferable that the compensation for the color variation includes: transforming type block data of the illumination characteristic data into a color temperature value and illuminance block data of the illumination characteristic data into a numerical value using a mapping table when the illuminance block data is a semantic value; and transforming an input image itself or adjusting a color temperature and an brightness characteristic or contrast characteristic of the image display device so as to correspond to numerical values of a color temperature and illuminance of the illumination characteristic data. It is preferable that the method further includes outputting an image in which a color variation has been compensated for.

According to yet another aspect of the present invention, there is provided a recording medium on which illumination characteristic data including a data format including a type block for indicating information on a type of illumination and an illuminance block for indicating information on illuminance of illumination is recorded. It is preferable that the type block includes a flag to indicate whether data in a type payload is a color temperature or a chromaticity coordinate value and the type payload to indicate one of the color temperature value when the flag includes information for indicating the color temperature value and the chromaticity coordinate value when the flag includes information for indicating the chromaticity coordinate value, and the illuminance block includes data for indicating a numerical Lux value.

According to yet another aspect of the present invention, there is provided a computer-readable recording medium on which one of the method of generating illumination characteristic data around an image display device and the method compensating for a color variation is recorded as a computer-executable program.

BRIEF DESCRIPTION OF THE DRAWINGS

The above and other characteristics and advantages of the present invention will become more apparent by describing in detail exemplary embodiments thereof with reference to the attached drawings in which.

DETAILED DESCRIPTION OF THE INVENTION

Hereinafter, the present invention will be described in detail with reference to the attached drawings.

Figure 1:
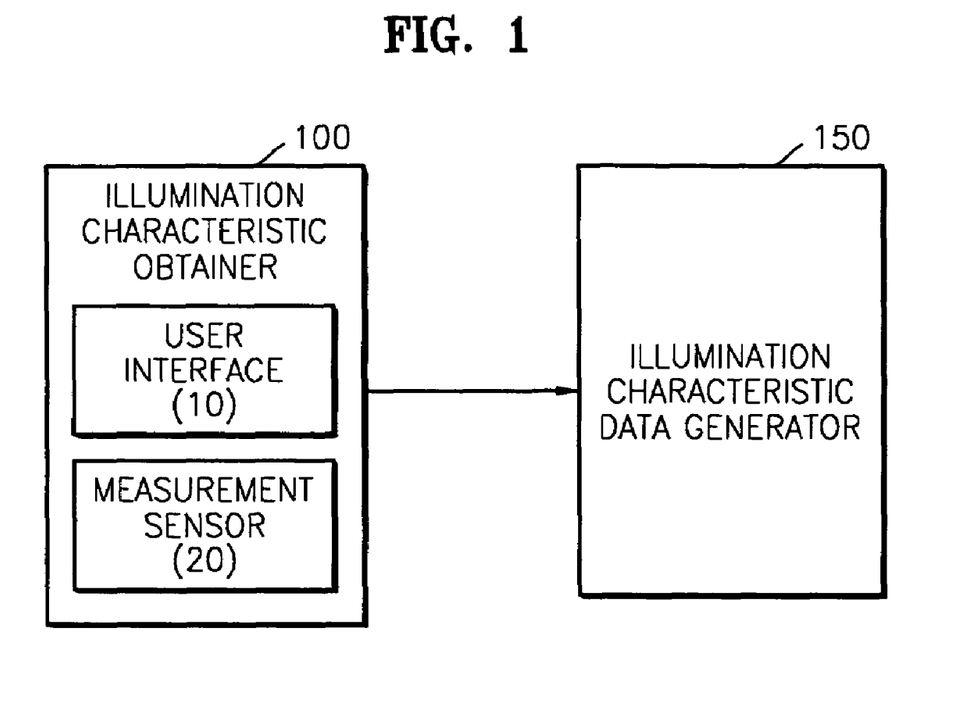
FIG. 1 is a block diagram of an apparatus for generating illumination characteristic data, according to the present invention.
Figure 2:
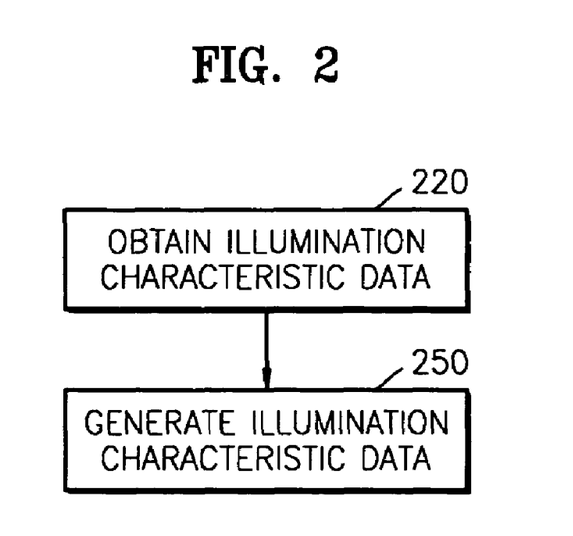
FIG. 2 is a flowchart for explaining a method of generating illumination characteristic data, according to the present invention.

FIG. 1 is a block diagram of an apparatus for generating illumination characteristic data, according to the present invention, and FIG. 2 is a flowchart for explaining a method of generating illumination characteristic data, according to the present invention.

Referring to FIGS. 1 and 2, the apparatus includes an illumination characteristic obtainer 100 and an illumination characteristic data generator 150.

The illumination characteristic obtainer 100 obtains illumination characteristic data around an image display device (step 220), and includes at least one of a user interface 10 and a measurement sensor 20.

The user interface 10 obtains illumination characteristic data directly from a user via an interface. The measurement sensor 20 obtains illumination characteristic data via a radiometer which is attached to or located near to the image display device.

The illumination characteristic data obtained by the user interface 10 includes information on the type and illuminance of illumination. The information on the type of illumination is about one of an incandenscent lamp, a flouresent lamp, daylight, and skylight. The information on the illuminance of illumination is about one of dark, dim, bright, very bright phases.

The illumination characteristic data obtained by the measurement sensor 20 includes information on the type and illuminance of illumination. The information on the type of illumination includes a numerical value, i.e., at least one of a color temperature value and a chromaticity coordinate value of illumination. The color temperature value refers to a color temperature of illumination and may be expressed with 8 bits according to the data expression of a color temperature descriptor. The chromaticity coordinate value refers to (x, y) coordinates in an x-y chromaticity coordinates of illumination. Here, the x-y chromaticity coordinates may use 2 chromaticity coordinates defined from a CIE1931 tri-stimulus coordinate model. It is preferable that the information on the illuminance of illumination is represented with a numerical value in the units of Lux.

The illumination characteristic obtainer 100 outputs the illumination characteristic data or transforms the illumination characteristic data obtained by the user interface 10 into the illumination characteristic data which comprises information on the type of illumination and information on the illuminance of illumination, wherein the information on the type of illumination comprises at least one of a color temperature of illumination and a coordinate value in chromaticity coordinates of illumination, and then outputs the transformed illumination characteristic data.

Figure 8:
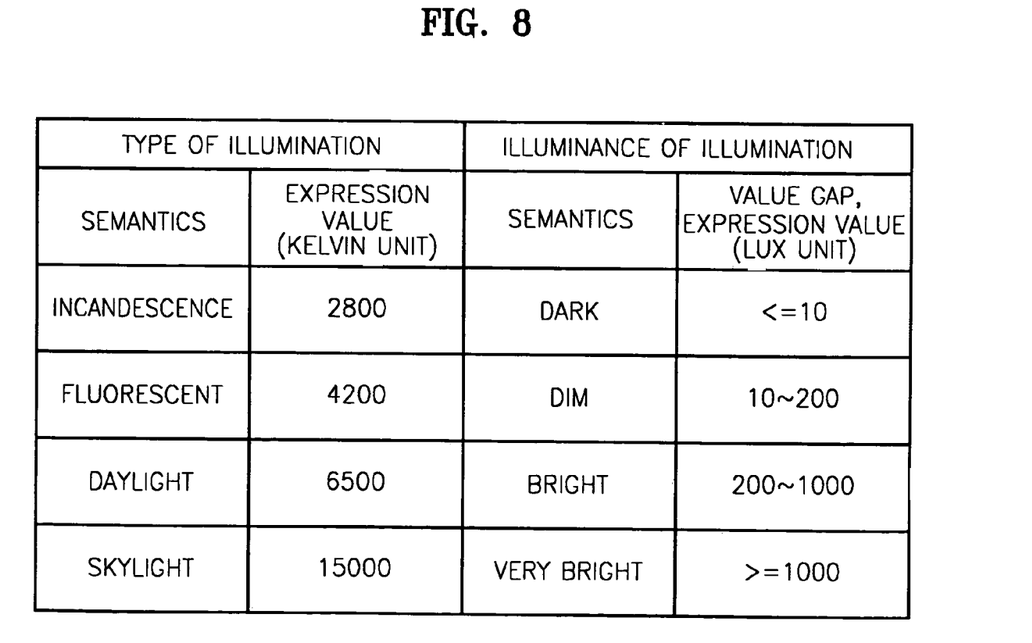
FIG. 8 is a mapping table showing the transformation relationship between a semantic value and numerical value.

The illumination characteristic obtainer 100 may transform the illumination characteristic data obtained by the measurement sensor 20 into the illumination characteristic data which comprises information on the type of illumination and information on the illuminance of illumination, wherein the information on the type of illumination is about one of an incandenscent lamp, a flouresent lamp, daylight, and skylight, and the information on illuminance of illumination is about dark, dim, bright, and very bright phases, and then outputs the transformed illumination characteristic data. The transformation of the illumination characteristic data may be realized using a mapping table as shown in FIG. 8.

The color temperature value and the chromaticity coordinate value may be approximately transformed using a daylight locus drawn at chromaticity coordinates.

There are various methods of obtaining a color temperature and chromaticity coordinate information of illumination from a signal output from the measurement sensor 20. For example, when the measurement sensor 20 outputs signals with a plurality of R, G, and B values for a plurality of pixels, pixels corresponding to illumination components are estimated and selected to obtain average R, G, and B values of the pixels and coordinates (x, y) in the x-y chromaticity coordinates or the color temperature is calculated from R, G, and B coordinate values. When the measurement sensor 20 outputs a signal with singular R, G, and B values, coordinates (x, y) in the x-y chromaticity coordinates or the color temperature may be directly calculated from R, G, and B coordinate values.

The illumination characteristic data generator 150 makes the illumination characteristic data obtained by the user interface 10 or the measurement sensor 20 into a data format including a type block for indicating information about the type of illumination and an illuminance block for indicating information about the illuminance of illumination (step 250).

Figure 3:
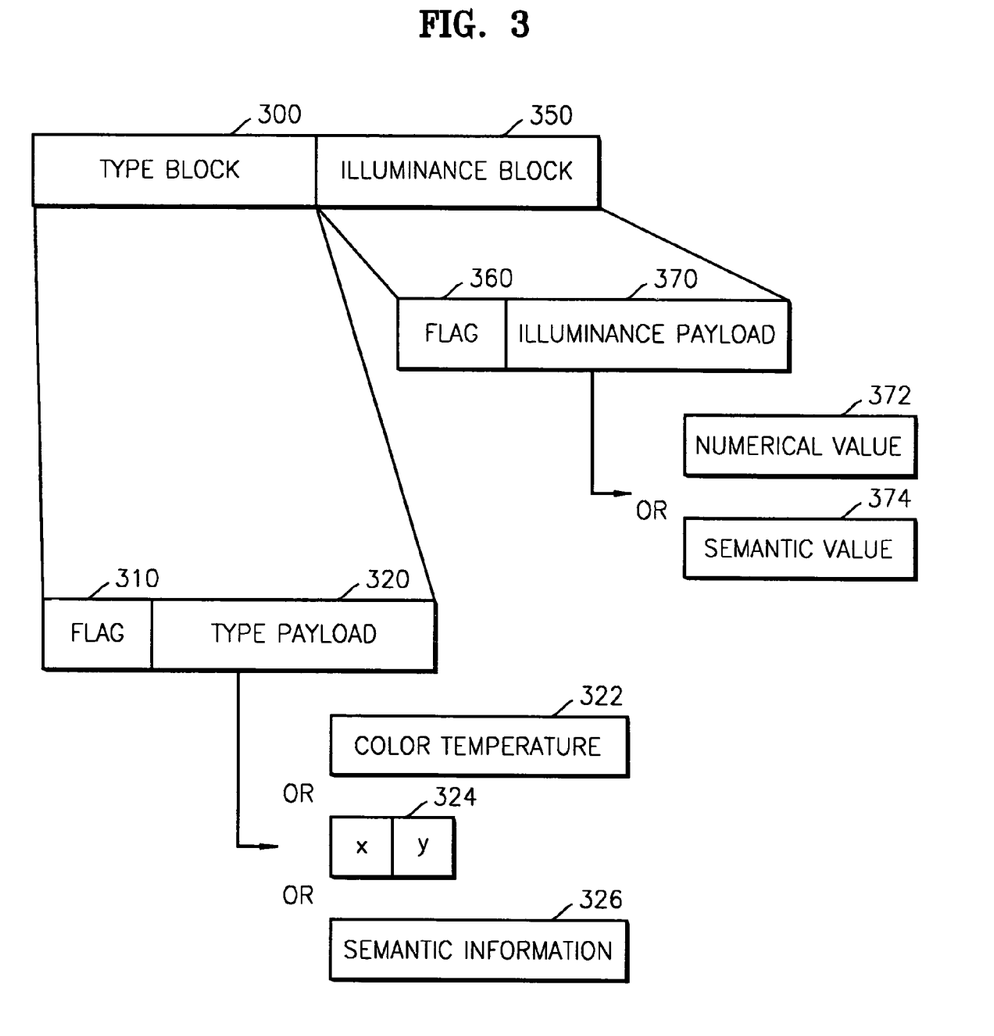
FIG. 3 is a view showing a format of illumination characteristic data, according to the present invention.

FIG. 3 is a view showing a format of illumination characteristic data, according to the present invention. Referring to FIG. 3, the format of the illumination characteristic data includes a type block 300 and an illuminance block 350.

The type block 300 includes a flag 310 and a type payload 320. The flag 310 indicates whether data in the type payload 320 is a color temperature value 322 or a chromaticity coordinate value 324. The flag 310 may further indicate whether the data in the type payload 320 is semantic information 326 about the type of illumination. When the flag 310 indicates that the data in the type payload 320 is the semantic information 326, it is preferable that the semantic information 326 is about one of an incandenscent lamp, a flouresent lamp, daylight, and skylight.

The flag 310 may have a value of "0", "1", "2", or "3". When the flag 310 has a value of "0", the data in the type payload 320 is the color temperature value 322 and quantized into 8 bits according to the data expression of an ISO/IEC 15938-3 color temperature descriptor.

When the flag 310 has a value of "1", the data in the type payload 320 is the chromaticity coordinate value 324. The range of coordinate value is [0, 1]. Each of the (x, y) coordinates can be represented with bits corresponding to MPEG7: ZeroToOneType specified in ISO/IED 15938-5.

When the flag 310 has a value of "2", the data in the type payload 320 is the semantic information 326. Also, when the semantic information 326 has a value of "0", the semantic information 326 indicates an incandenscent lamp. When the semantic information 326 has a value of "1", the semantic information 326 indicates a flouresent lamp. When the semantic information 326 has a value of "2", the semantic information 326 indicates daylight. When the semantic information 326 has a value of "3", the semantic information 326 indicates skylight.

The illuminance block 350 includes data for indicating a numerical Lux value. However, the illuminance block 350 may include a flag 360 and an illuminance payload 370. In this case, the flag 360 indicates whether data in the illuminance payload 370 is a numerical value 372 or a semantic value 374. When the flag 360 indicates the numerical value 372, the illuminance payload 370 includes data for indicating the numerical Lux value 372. When the flag 360 indicates the semantic value 374, the illuminance payload 370 includes data for indicating one of dark, dim, bright, and very bright phases. When the flag 360 has a value of "0", the data in the illuminance payload 370 is the numerical Lux value 372. Here, the numerical value 372 can be represented in a data type corresponding to a nonNegativeInteger data type according to XML schema specified in N3C Recommendation 02-May-2001. When the flag 360 has a value of "1", the data in the illuminance payload 370 is the semantic value 372. When the semantic value 372 is "0", the semantic value 372 indicates the dark phase. When the semantic value 372 is "1", the semantic value 372 indicates the dim phase. When the semantic value 372 is "2", the semantic value 372 indicates the bright phase. When the semantic value 372 is "3", the semantic value 372 indicates the very bright phase.

The illumination characteristic data obtained by the illumination characteristic data generator 150 can be represented as XML data according to an XML-schema as follows.

1. Illumination Characteristic Syntax

```
<!-- ################################################### -->
<!-- Definition of IlluminationCharacteristics -->
<!-- ################################################### -->
<complexType name="IlluminationCharacteristicsType">
   <complexContent>
      <extension base="dia:NaturalEnvironmentCharacteristicsBaseType">
         <sequence>
            <element name="TypeOfIllumination" minOccurs="0">
               <complexType>
                  <sequence>
                     <choice>
                        <element name="ColorTemperature"
                           type="mpeg7:unsigned8"/>
                        <element name="Chromaticity">
                           <complexType>
                              <sequence>
                                 <element name="x"
                                    type="mpeg7:zeroToOneType"/>
                                 <element name="y"
                                    type="mpeg7:zeroToOneType"/>
                              </sequence>
                           </complexType>
```

-continued

```
                        </element>
                     </choice>
                  </sequence>
               </complexType>
            </element>
            <element     name="Illuminance" type="nonNegativeInteger "
               minOccurs="0"/>
         </sequence>
      </extension>
   </complexContent>
</complexType>
```

2. Illumination Characteristic Semantics

"IlluminationCharacteristicsType" describes the overall illumination characteristics of the natural environment.

"TypeOfIllumination" describes the type of overall illumination.

"ColorTemperature" indicates the correlated color temperature of the overall illumination. The value expression is obtained through the quantization of the range [1667.25000] into 8 bits in a non-uniform way as specified in ISO/IEC 15938-3.

"Chromaticity" indicates the chromaticity of the overall illumination, where "x" and "y" indicate the x and y coordinates of the overall illumination in chromaticity coordinates, respectively. The range of coordinate value is [0, 1].

"Illuminance" describes the overall illuminance of illumination in the units of Lux.

3. Illumination Characteristic Example

```
<DIA>
   <Description xsi:type="UsageEnvironmentType">
      <UsageEnvironment xsi:type=
         "NaturalEnvironmentCharacteristicsType">
         <NaturalEnvironmentCharacteristics
            xsi:type="IlluminationCharacteristicsType">
            <TypeOfIllumination>
               <ColorTemperature>159</ColorTemperature>
            </TypeOfIllumination>
            <Illuminance>500</Illuminance>
         </NaturalEnvironmentCharacteristics>
      </UsageEnvironment>
   </Description>
</DIA>
```

The illumination characteristic data according to the present invention may be used as an input of a color variation compensating apparatus.

An apparatus and method for compensating for a color variation caused by the affect of illumination using the above-described illumination characteristic data will now be explained.

A visual color variation in an image displayed on an image display device with an input of chromaticity and illuminance of illumination is estimated in chromaticity coordinates. The compensation for the color variation in the image is performed using the estimated variation coordinates, and then the image is displayed on the image display device. As a result, the image can be displayed with desired color characteristics by removing the affect of illumination.

Figure 4:
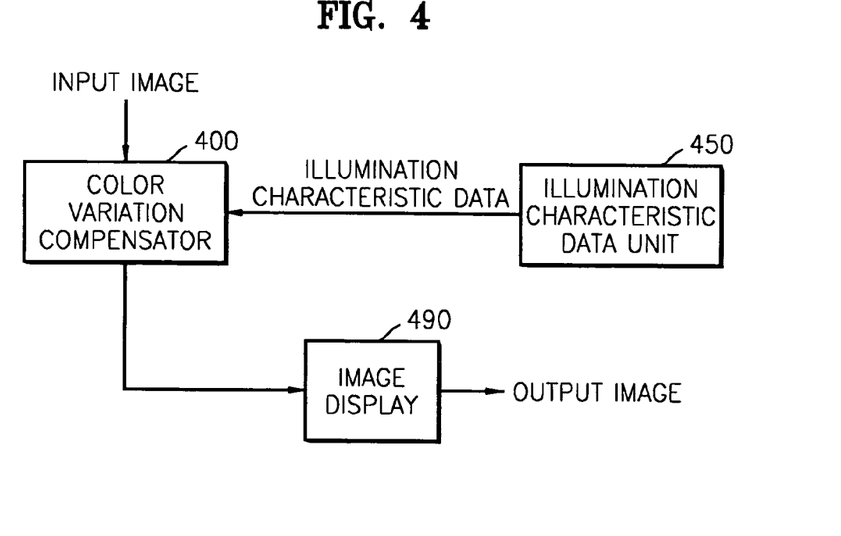
FIG. 4 is a block diagram of an apparatus for compensating for a color variation, according to the present invention.

FIG. 4 is a block diagram of an apparatus for compensating for a color variation, according to the present invention. Referring to FIG. 4, the apparatus includes an illumination characteristic data unit 450 and a color variation compensator

400. The apparatus may further include an image display device 490 so as to meet the conditions of the present invention.

Figure 5:
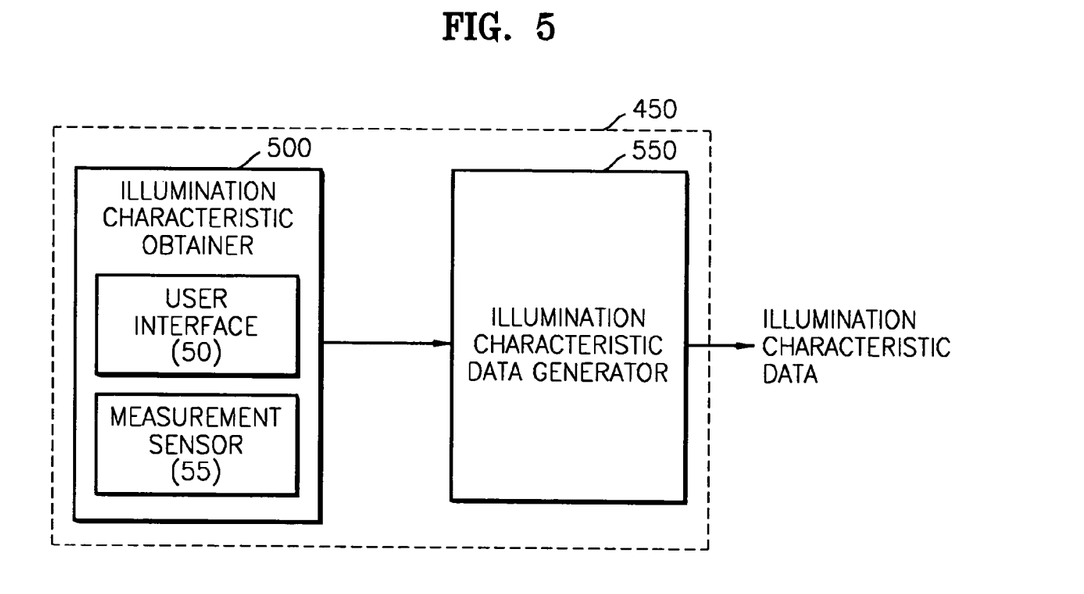
FIG. 5 is a block diagram of an illumination characteristic data unit of FIG. 4.

As shown in FIG. 5, the illumination characteristic data unit 450 serves as the illumination characteristic data generator 150 and includes an illumination characteristic obtainer 500 and an illumination characteristic data generator 550. The illumination characteristic data unit 450 also generates and outputs illumination characteristic data around the image display device. Here, the illumination characteristic data has the data structure with the type block and the illuminance block. In a case where the illumination characteristic data has been already obtained, the illumination characteristic data unit 450 may include only the illumination characteristic data generator 550.

In order to obtain illumination characteristic data on the type and illuminance of illumination, the illumination characteristic data generator 550 includes at least one of a user interface 50 and a measurement sensor 55. Here, the user interface 50 obtains illumination characteristic data directly from a user via an interface, and the measurement sensor 55 obtains illumination characteristic data by sensing actual illumination characteristics and measuring the actual illumination characteristics as numerical values.

The illumination characteristic data generator 550 makes the illumination characteristic data into a data format including a type block for indicating information about the type of illumination and an illuminance block for indicating information about the illuminance of illumination.

The type block includes a flag and a type payload. The flag indicates whether data in the type payload is a color temperature value or a chromaticity coordinate value. When the flag indicates the color temperature value, the data in the type payload is a color temperature value. When the flag indicates the chromaticity coordinate value, the data in the type payload is the chromaticity coordinate value. The illuminance block indicates a numerical value for indicating the illuminance of illumination.

The flag of the type block may include information for indicating whether the data in the type payload is the color temperature value, the chromaticity coordinate value, or semantic information on the type of illumination. When, the flag includes information for indicating the semantic information, the type payload indicates one of an incandenscent lamp, a flouresent lamp, daylight, and skylight.

As another aspect, the illuminance block may include a flag and an illuminance payload. The flag indicates whether data in the illuminance payload is a numerical value or a semantic value. When the flag indicates the numerical value, the illuminance payload indicates a numerical Lux value. When the flag indicates the semantic value, the illuminance payload indicates one of dark, dim, bright, and very bright phases.

Figure 6:
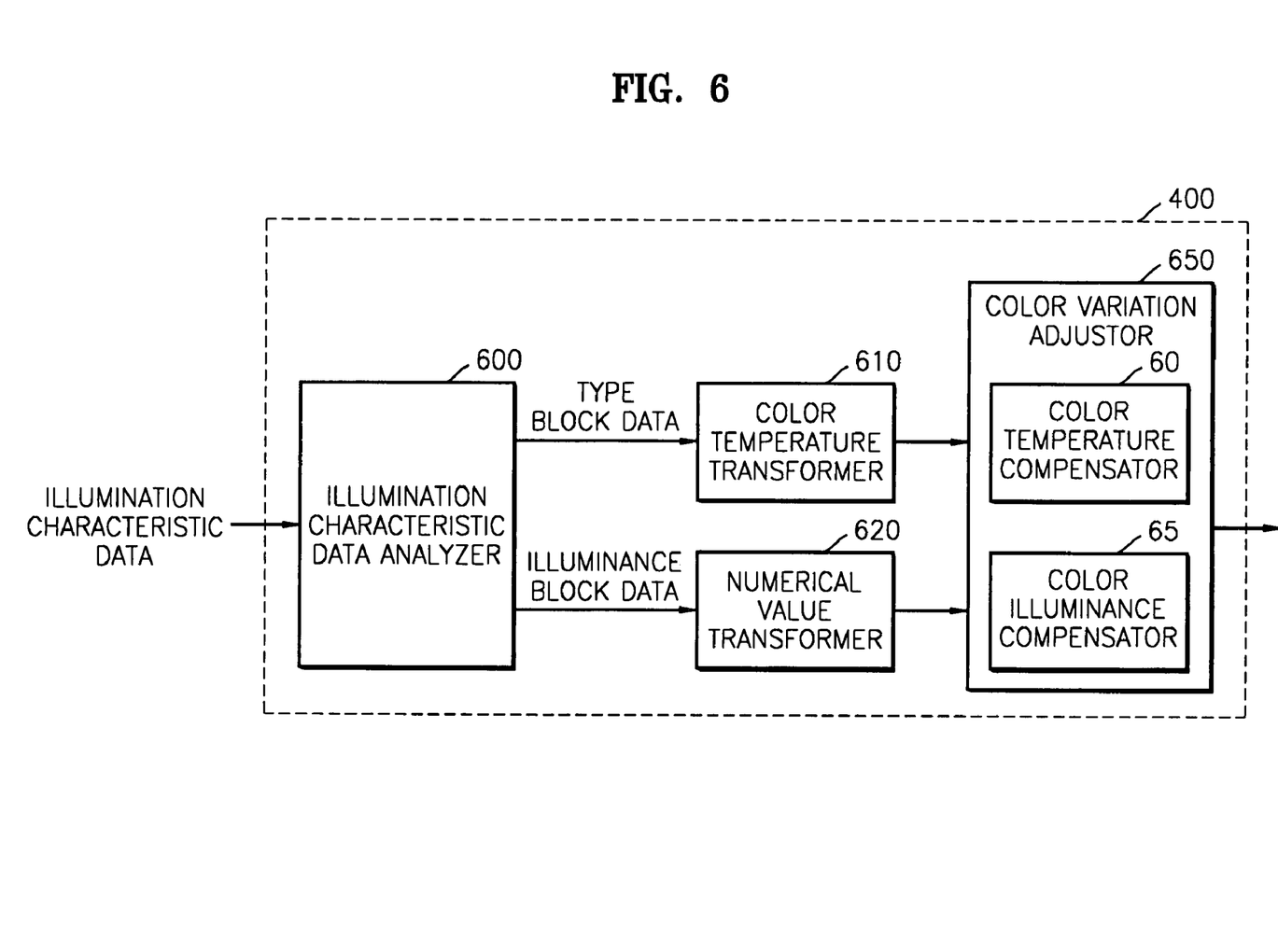
FIG. 6 is a block diagram of a color variation compensator of FIG. 4.

The color variation compensator 400 includes an illumination characteristic data analyzer 600, a color temperature transformer 610, a numerical value transformer 620, and a color variation adjustor 650. The color variation compensator 400 analyzes the illumination characteristic data generated by the illumination characteristic data unit 450 and compensates for the color variation in an input image according to the type and illuminance of illumination.

The illumination characteristic data analyzer 600 analyzes the illumination characteristic data into type block data and illuminance block data.

The color temperature transformer 610 transforms the type block data into a color temperature value. In a case where the type block data is coordinates (x,y), the color temperature transformer 610 transforms the type block data into the color temperature value. When the type block data is a semantic value, the color temperature transformer 610 transforms the type block data into the color temperature value using the mapping table of FIG. 8.

When the illuminance block data is a semantic value, the numerical value transformer 620 transforms the illuminance block data into a numerical Lux value using the mapping table of FIG. 8. When the illuminance block data indicates a dark phase, the numerical value transformer 620 transforms the illuminance block data into the maximum value in the dark phase. When the illuminance block data indicates a very bright phase, the numerical value transformer 620 transforms the illuminance block data into the minimum value in the very bright phase. When the illuminance block data indicates other phases, the numerical value transformer 620 transforms the illuminance block data into a middle value in the other phases.

The color variation adjustor 650 includes a color temperature compensator 60 and a color illuminance compensator 65. The color variation adjustor 650 transforms the input image itself so as to correspond to a color temperature value and a numerical illuminance value of the illumination characteristic data or adjusts a color temperature and an illumination characteristic of the image display device.

When the color temperature value of illumination is higher than a currently set color temperature value of illumination or a recommended color temperature value of the image display device, the color temperature compensator 60 transforms the input image or adjusts a color temperature display characteristic of the image display device to increase a color temperature value of an image to be displayed. When the color temperature value of illumination is lower than the currently set color temperature value of illumination or the recommended color temperature value of the image display device, the color temperature compensator 60 transforms the input image or adjusts the color temperature display characteristic of the image display device to reduce the color temperature value of the image to be displayed. An example of a method of increasing or reducing the color temperature of the input image will be explained briefly. A difference between a reference color temperature and a varied color temperature of the reference color temperature is calculated. Here, the reference color temperature is preset in consideration of the characteristics of the image display device, and the varied color temperature is produced by the effect of illumination. Next, a difference between the color temperature of the input image and the reference color temperature is estimated. A target color temperature is determined according to a ratio of the calculated differences. A color temperature transformation coefficient is calculated to transform the color temperature of the input image into the target color temperature. A transformation matrix obtained from the color temperature transformation coefficient is multiplied by R, G, and B vectors of each pixel of the input image to obtain R, G, and B pixel values of a finally output image. As an example of a method of estimating the color temperature of the input image, pixels corresponding to illumination components of the input image are determined, average R, G, and B values of the pixels are calculated, and chromaticity coordinates corresponding to the R, G, and B values are calculated. Thereafter, points on the same color temperature curve nearest to the chromaticity coordinates are calculated, and a color temperature of the points are set to the color temperature of the input image.

When a Lux value of illumination is higher than a currently set Lux value of illumination or a recommended Lux value of illumination around the image display device, the color illuminance compensator 65 transforms the input image or adjusts the brightness characteristic and contrast characteristic of the image display device to increase an brightness value or contrast value of the image to be displayed. When the Lux value of illumination is lower than the currently set Lux value of illumination or the recommended Lux value of illumination around the image display device, the color illuminance compensator 65 transforms the input image or adjusts the brightness characteristic and contrast characteristic of the image display device to reduce the brightness value or contrast value of the image to be displayed.

The illuminance of the image to be displayed may be adjusted using the follow method. A Y value in YcbCr color coordinates is calculated from each pixel of the image to be displayed and then input to a mapping function such as a Sigmoidal function to obtain a Y' value. Next, the newly calculated Y' value is transformed into a value in original chromaticity coordinates. The illuminance of the image to be displayed may be adjusted using other methods.

When a color temperature and illuminance of an image are transformed, it is preferable that the illuminance is first transformed and then the color temperature is transformed.

Figure 7:
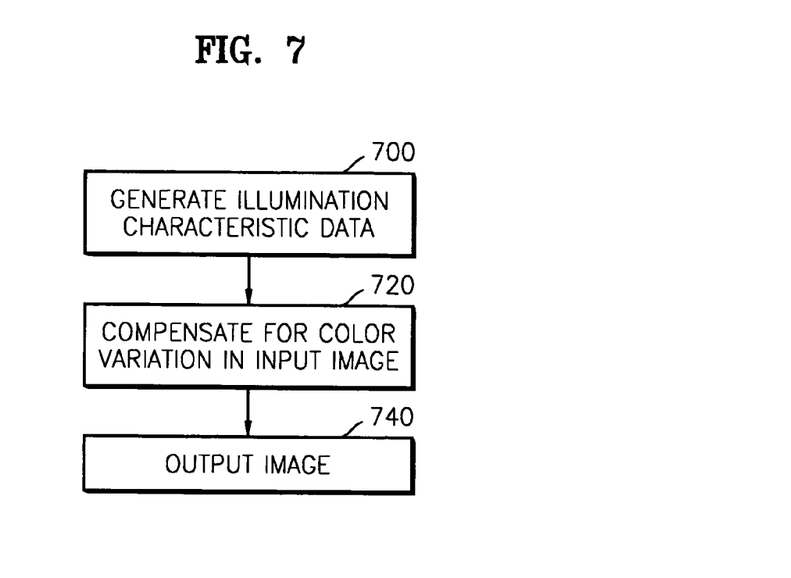
FIG. 7 is a flowchart for explaining a method of compensating for a color variation using illumination characteristic data.

FIG. 7 is a flowchart for explaining a method of compensating for a color variation caused by the affect of illumination using the above-described illumination characteristic data. Referring to FIG. 7, in step 700, the illumination characteristic data around the image display device is generated. Here, the illumination characteristic data includes the data format having the type block and the illuminance block generated by the illumination characteristic data unit 450. In step 720, the color variation compensator 400 analyzes the illumination characteristic data to compensate for the color variation in the input image according to the type and illuminance of illumination. In step 740, the image display device 490 outputs the input image which has experienced the compensation for the color variation.

As described above, in an illumination characteristic data generating method and apparatus according to the present invention, illumination characteristic data is generated around an image display device. With an input of the illumination characteristic data, a visual color variation in an output image caused by the affect of illumination can be compensated for. Thus, a color characteristic of an initial input image can be represented for an image displayed on the image display device. Also, a data structure of the illumination characteristic data can be represented in a general-purpose data format compatible with an XML, a binary stream, or the like. As a result, the data structure can be widely used for compensating for a color variation caused by the affect of illumination in various types of image displays, image software, and a service system which provides user devices with an image by wire and/or wireless. In particular, the data structure can be used for producing an image suitable for physical environment characteristics for a user.

The present invention may be embodied in a code, which can be read by a computer, on a computer readable recording medium. The computer readable recording medium can be any kind of recording apparatuses on which computer readable data are stored.

The computer readable recording media includes storage media such as magnetic storage media (e.g., ROM's, floppy disks, hard disks, etc.), and optically readable media (e.g., CD-ROMs, DVDs, etc.). Also, the computer readable recording media can be scattered on computer systems connected through a network and can store and execute a computer readable code in a distributed mode.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating characteristic data of illumination around an image display device, comprising:
obtaining predetermined illumination characteristic data of illumination around the image display device, either using a measurement sensor or directly from a user via an interface; and
making the predetermined illumination characteristic data into a data format comprising a type block and an illuminance block,
wherein the type block indicates information on a type of illumination, and the illuminance block indicates information on the illuminance of illumination,
the information on the type of illumination comprising at least one of a color temperature of illumination which is expressed by an 8-bit quantization value and a coordinate value having the range of [0,1] in Chromaticity coordinates of illumination, and
the information on the illuminance of illumination being a numerical illuminance value which is represented in the units of Lux and has a value equal to or greater than 0, and
wherein the type block comprises:
a flag to indicate whether data in a type payload is a color temperature value or a chromaticity coordinate value.

2. The method of claim 1, wherein the information on the type of illumination is about one of an incandescent lamp, a fluorescent lamp, daylight, and skylight.

3. The method of claim 1, wherein the information on illuminance of illumination is about one of dark, dim, bright, and very bright phases.

4. The method of claim 1, wherein the predetermined illumination characteristic data obtained by the user interface is transformed using a predetermined mapping table into the illumination characteristic data which comprises information on the type of illumination and information on the illuminance of illumination, wherein the information on the type of illumination comprises at least one of a color temperature of illumination and a coordinate value in chromaticity coordinates of illumination.

5. The method of claim 1, wherein the flag further comprises information for indicating whether the data in the type payload is semantic information on the type of illumination, and the type payload further comprises information on one of an incandescent lamp, a fluorescent lamp, daylight, and skylight when the flag is information indicating for semantic information.

6. The method of claim 5, wherein when the flag has a value of "2", the data in the type payload is semantic information, and when the semantic information has a value of "0", the semantic information indicates the incandescent lamp, when the semantic information has a value of "1", the semantic information indicates the fluorescent lamp, and when the semantic information has a value of "3", the semantic information indicates the daylight.

7. The method of claim 1, wherein when the flag has a value of "0", the data in the type payload is the color temperature value, and when the flag has a value of "1", the data in the type payload is x-y chromaticity coordinates.

8. The method of claim 1, wherein the illuminance block comprises data for indicating a numerical Lux value.

9. The method of claim 1, wherein the illuminance block comprises:

a flag to indicate whether data in an illuminance payload is a numerical value or a semantic value; and the illuminance payload comprising the data for indicating a numerical Lux value when the flag comprises information for indicating the numerical value or one of dark, dim, bright, and very bright phases when the flag comprises information for indicating the semantic value.

10. The method of claim 9, wherein when the flag has a value of "0", the data in the illuminance payload indicates the numerical Lux value, when the flag has a value of "1", the data in the illuminance payload indicates the semantic value, and when the semantic value is "0", the semantic value indicates the dark phase, when the semantic value is "1", the semantic value indicates the dim phase, when the semantic value is "2", the semantic value indicates the bright phase, and when the semantic value is "3", the semantic value indicates the very bright phase.

11. An apparatus for generating characteristic data of illumination around an image display device, comprising:

an illumination characteristic obtainer which obtains characteristic data of illumination comprising information on a type and illuminance of illumination; and an illumination characteristic data generator which makes the illumination characteristic-data into a data format comprising a type block and an illuminance block, wherein the type block indicates information on the type of illumination, and the illuminance block indicates information on the illuminance of illumination, the information on the type of illumination comprising at least one of a color temperature of illumination which is expressed by an 8-bit quantization value and a coordinate value having the range of [0,1] in chromaticity coordinates of illumination, and the information on the illuminance of illumination being a numerical illuminance value which is represented in the units of Lux and has a value equal to or greater than 0, wherein the type block comprises:

a flag to indicate whether data in a type payload is a color temperature value or a chromaticity coordinate value.

12. The apparatus of claim 11, wherein the information on the type of illumination is about one of an incandescent lamp, a fluorescent lamp, daylight, and skylight, and the information on illuminance of illumination is about dark, dim, bright, and very bright phases.

13. The apparatus of claim 11, wherein the information on the type of illumination comprises at least one of a color temperature of illumination and a coordinate value in chromaticity coordinates of illumination, and the information on the illuminance of illumination is a numerical illuminance value represented in the units of Lux.

14. The apparatus of claim 11, wherein the illumination characteristic obtainer comprises at least one of a user interface and a measurement sensor, the user interface obtaining illumination characteristic data directly from a user via an interface and the measurement sensor obtaining illumination characteristic data by measuring illumination characteristics.

15. The apparatus of claim 11, wherein the type block comprises:

a flag to indicate whether data in the type payload is a color temperature value, a chromaticity coordinate value, or semantic information on the type of illumination; and the type payload to indicate the color temperature value when the flag comprises information for indicating the color temperature value, the chromaticity coordinate value when the flag comprises information for indicating the chromaticity coordinate value, or one of an incandescent lamp, a fluorescent lamp, daylight, and skylight when the flag comprises information for indicating the semantic information, and the illuminance block comprises:

a flag to indicate whether data in an illuminance payload is a numerical value or a semantic value; and the illuminance payload comprising the data for indicating a numerical Lux value when the flag comprises data for indicating the numerical value or one of dark, dim, bright, and very bright phases when the flag comprises data for indicating the semantic value.

16. A computer-readable recording medium on which characteristic data of illumination is stored, comprising:

a data format comprising a type block for indicating information on a type of illumination and an illuminance block for indicating information on illuminance of illumination is recorded, wherein the information on the type of illumination comprises at least one of a color temperature of illumination which is expressed by an 8-bit quantization value and a coordinate value having the range of [0,1] in chromaticity coordinates of illumination, and the information on the illuminance of illumination is a numerical illuminance value which is represented in the units of Lux and has a value equal to or greater than 0, wherein the type block comprises:

a flag to indicate whether data in a type payload is a color temperature or a chromaticity coordinate value.

17. A computer-readable recording medium on which the invention of claim 1 is recorded as a computer-executable program.

* * * * *

UNITED STATES PATENT AND TRADEMARK OFFICE
CERTIFICATE OF CORRECTION

PATENT NO. : 7,616,214 B2 Page 1 of 1
APPLICATION NO. : 10/733406
DATED : November 10, 2009
INVENTOR(S) : Huh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1676 days.

Signed and Sealed this

Nineteenth Day of October, 2010

David J. Kappos
*Director of the United States Patent and Trademark Office*